United States Patent [19]

Hoesselbarth

[11] 4,389,924
[45] Jun. 28, 1983

[54] COFFEE MACHINE

[75] Inventor: Helmut Hoesselbarth, Weilheim, Fed. Rep. of Germany

[73] Assignee: Wurttembergische Metallwarenfabrik, Fed. Rep. of Germany

[21] Appl. No.: 254,183

[22] Filed: Apr. 14, 1981

[30] Foreign Application Priority Data

Apr. 15, 1980 [DE] Fed. Rep. of Germany ....... 3014452

[51] Int. Cl.³ .............................................. A47J 31/36
[52] U.S. Cl. .................................. 99/289 R; 99/302 P
[58] Field of Search ............. 99/289 R, 289 T, 289 P, 99/287, 297, 302 R, 302 P, 295

[56] References Cited

U.S. PATENT DOCUMENTS

| | | | |
|---|---|---|---|
| 3,349,690 | 10/1967 | Heier | 99/289 |
| 3,496,861 | 2/1970 | Stahler | 99/289 |
| 3,552,976 | 1/1971 | King | 99/289 |
| 4,271,753 | 6/1981 | Neely | 99/289 |

*Primary Examiner*—Robert W. Jenkins
*Attorney, Agent, or Firm*—Darby & Darby

[57] ABSTRACT

A coffee machine is disclosed which is of the type including a horizontal guide track and a brewing unit mounted for reciprocal movement on the guide track between predefined rest and brewing positions. The machine has first and second slides mounted for sliding movement on the track, a straining unit mounted to the side for movement therewith, a brewing chamber formed integrally with a cylinder that extends above it and a plunger which is axially movable into and out of the cylinder when it is in the brewing position in order to force brewing water into the brewing chamber from the cylinder. The brewing chamber has an open bottom and is mounted to the second slide means in a position above the straining unit for movement therewith. The brewing chamber can be moved into a predefined loading position in alignment with the straining unit into the brewing position together with the straining unit, and into an emptying position in which it is horizontally displaced with respect to the straining unit. Provision is made for lifting the brewing unit prior to introducing relative movement between it and the straining unit in order to avoid excessive wear of the sealing surfaces between them.

35 Claims, 11 Drawing Figures

COFFEE MACHINE

The present invention relates generally to coffee machines and, in particular, concerns coffee brewing machines of the type in which a brewing unit is reciprocally operated over guide means between rest and brewing positions.

In a known coffee machine of this kind (German Pat. No. 21 12 609), the first slide carrying the straining unit is shiftable on two guide rods against the force of two pressure springs urging it into the resting position. The second slide which is shiftable on its own guide rods against the force of two further pressure springs carries the brewing chamber which is designed as a tubular piece open at the top and bottom with a slight conical enlargement in the upper edge zone. When in the resting position, in which the pressure springs of the slides are relaxed, the two slides occupy a relative position to one another, which corresponds to the emptying position. The brewing chamber, exposed at the top and bottom, is at the end of the guide track, and the lower disposed straining unit is in front in the direction of the brewing position. To move the unit into the brewing position, the second slide is first moved by means of a cable mechanism over the stationary first slide, until the brewing chamber is above the straining unit. From there on, the second slide carries along the first slide in its movement into the brewing position.

When in the brewing position, a cylinder is mountable on the brewing chamber, said cylinder having a diameter larger than that of the brewing chamber. The cylinder bottom has a central opening surrounded by a sealing surface with a diameter corresponding to the upper surface of the brewing chamber. The cylinder is vertically movable by means of two parallel guide rods which are firmly mounted on the cylinder at their lower ends and are joined by a bridge member at their upper ends. The guide rods each have one stationary support member and one bar shiftable vertically on said guide rods. Each guide rod carries a spring plate and is loaded downward by a pressure spring clamped between the said spring plate and the bar. The cylinder is raisable, against the spring force, by means of a cam disk, which is mounted on a control shaft underneath the bridge member and and which cooperates with a cam roller on the bridge member.

The bar which is vertically shiftable on the guide rods, is disposed underneath the control shaft and carries a plunger and a roller which, for a vertical movement of the plunger, cooperates with a further cam disk disposed on the control shaft. With a downward movement of the plunger, the pressure springs on the guide rods are additionally tensioned, the tight engagement of the cylinder against the brewing chamber being thus intensified.

A further cam disk disposed on the control shaft controls the cable mechanism for the slide movements, the slides being held in the brewing position, against the return force of their springs, only by the pressure of the cylinder.

In this known coffee machine, the brewing process, i.e. the squeezing of the brewing water through the grind by the downward moving plunger, requires a high moment of torsion on the control shaft. The cam disk pressing the plunger downward must not only provide the force for the squeezing out of the coffee, but must also provide an increased force to squeeze together the compression springs at the guide rods. In addition, there is a risk that if the guide rods are not absolutely parallel and vertically disposed, frictional forces will occur between these guide rods and the bar, which frictional forces must likewise be overcome by the drive motor of the control shaft. The motor must be designed for these demands. Furthermore, in the coffee machines of the prior art, the constructional requirements for an exact guidance of the plunger bar are an additional drawback. Moreover, the gaskets between the cylinder and the brewing chamber are subject to considerable loads, especially by the lateral forces acting from the direction of the slide springs, as well as on account of the frequently damaged sealing edge of the cylinder and in consequence of different positions between brewing chamber and cylinder.

It is an object of the invention to simplify the construction of a coffee machine of the kind mentioned above and to increase its efficiency, while still operating with an economical motor.

This object is achieved in accordance with the invention by joining the cylinder with the brewing chamber, its vertical guiding and moving means being dispensed with. In addition, no vertical forces for a tight pressure of the cylinder need be provided by the motor during the brewing process. The turning moment to be applied during the working stroke of the plunger is thus not increased either by such compression forces or by frictional forces to be applied at the cylinder bearings. The turning moment can thus be kept within a magnitude such as to allow the use of a shaded-pole motor as drive for the control shaft. Shaded-pole motors are inexpensive and reliable drive motors which, however, can be built only up to a certain size. The use of motors with greater loading capacities increases the manufacturing costs to such an extent that maintaining a low turning moment offers an important economic advantage.

In the known coffee machine, the brewing chamber is mounted vertically movable on the second slide by means of two vertically disposed tension springs. The springs hold the brewing chamber at a height relative to the first slide that makes possible a sliding over the straining unit. The sealing pressure of the brewing chamber against the straining unit is effected by a load which is produced during the mounting of the cylinder in the brewing position by its pressure springs, and is amplified by the plunger bar during the brewing process. At the end of the return movement, at which the second slide travels with the brewing chamber beyond the path of the first slide, arms pivotally mounted at the guide track cooperate with noses at the brewing chamber in such a way as to raise the brewing chamber against the force of the tension springs and let it drop abruptly at the end of the movement. As a result of this sudden jerk, the consumed coffee grind, especially that lying on the conical edge zones, will be removed.

In the coffee machine according to the invention, a power accumulator engages the structural unit in a simple manner, and, as lifting means, rigid stop surfaces to the side of the guide track cooperate with rigid and elastic projections at the structural unit and the second slide. The power accumulator holds the entire structural unit in sealing contact with the straining unit, without further forces being required to be applied in the brewing position. Thus, power accumulators, particularly springs, are dispensed with, these are elements which, because of fatigue manifestations, must often be renewed. The implementation of the lifting means as rigid stop surfaces results in a simple construction, is less trouble prone and wear resistant. The simple construction makes it possible to arrange lifting means at more than one section of the guide track (this permits raising the structural unit from the straining unit in different positions during a working cycle) without incurring uneconomical manufacturing costs.

In a preferred embodiment of the invention, the power accumulator constitutes a spiral spring mounted prestressed at the second slide. This spring simplifies mounting and demounting and tends less to develop fatigue manifestations than screw-like tension springs.

Preferably, the spiral spring can be essentially of a U-shaped configuration and is supported with arms extending on either side of the structural unit in grooves on the latter. The spiral spring thus holds the structural unit in normal position not only at the bottom, but also prevents undesirable lateral and tilting movements.

In a simple manner, the spring can be utilized for lifting the structural unit during the movement into the emptying position. By providing on the spring adjacent to each point of support on the structural unit laterally protruding loops which are bent at its arms, which as projections cooperate with stop surfaces laterally to the guide track. Preferably, the stop surfaces are arranged in the area of the emptying position, recede at their ends facing towards the brewing position in direction of the latter, and vertically break off at their opposite ends. Upon movement into the brewing position, the loops of the spring thus slide through under the stop surfaces, and the spring thus holds the structural unit in its sealing contact with the straining unit. At the return movement, the brewing unit, by the running up of the loops, is slightly raised and the structural element is moved abruptly downward at the end of the stop surface. This jerking movement causes the used up coffee grind to fall off.

As a further constructional simplification, the noses on the structural element, which contain grooves for mounting the spiral spring, can have slanted surfaces at their lower section cooperating with further stop surfaces receding toward the brewing position, said slanted surfaces being disposed laterally to the guide track on the end zone facing away from the brewing unit. The second slide reaches this end zone of the guide track before the first slide. By the cooperation of the noses with the stop surfaces, the structural unit is again raised slightly. As a result, the first slide can readily, and without any stress on the sealing surfaces, get into the end position underneath the second slide.

In a preferred embodiment of the invention, a stripper is disposed on the second slide toward the direction of movement into the brewing position and in front of the structural element for the straining unit, said stripper being loaded by a power accumulator in a downward direction. Upon moving into the emptying position, the stripping means runs over the straining unit behind the structural unit. The stripping means assures that no coffee grind remains behind on the straining unit. The structural unit need not strip off the straining unit itself, and can thus be raised at the beginning of the relative movement between structural unit and straining unit. As a consequence, the respective sealing surfaces are not unduly worn.

A further preferred constructional simplification is achieved in the coffee machine according to the invention in that the slide rods which serve as guide track for the first slide are used also as guide track for the second slide, and the pressure springs for the return movement engage only at the first slide. As a consequence, two slide rods and two pressure springs are dispensed with as compared to the coffee machine of the prior art. In addition, a lower overall height results.

The joint movement of both slides is assured in a simple manner in that the two slides are mounted with two slide elements on each slide rod, spaced apart from one another, in such a way that each slide rod has mounted on it the slide elements of both slides alternately following one another. The front slide elements of the first slide being in front toward the direction of movement into the brewing position, followed by the front slide elements of the second slide. Upon moving into the brewing position, the actuatable second slide thus carries the first slide with it, while at the return movement the first slide, acted upon by the pressure springs, assists the second slide in its movement, as long as both slides are freely movable toward one another.

The drawbacks of the cable mechanism causing the movement of the second slide in the aforedescribed known coffee machine were already considered. A preferred embodiment of the coffee machine according to the invention is characterized in that, as drive means for the second slide carrying the structural unit, a lever drive unit engages the second slide, the lever drive unit being controlled by a cam disk disposed on a drive shaft. The lever drive unit operates with greater precision than a cable mechanism, which may expand, and has the important advantage that it can effect a movement of the second slide in both directions of movement.

In a simple manner, the lever drive unit can have an angle lever mounted on a wall of the housing and loaded by means of a power accumulator, the angle lever having one short arm and one long arm, the short arm being connected with a vertically guided rod carrying at its free end a roll cooperating with the cam disk, and the long arm having its free end pivotally connected with the free end of a tension rod. The tension rod has a second end engaging the second slide and moving the latter into the brewing position under the action of the cam disk and into the resting position under the action of the power accumulator. The structural elements can thus be accommodated laterally to the wall of the housing with a minimum in space requirement.

In a simple manner, the power accumulator can be embodied as a torsion spring mounted at the bearing for the angle lever and pressing the rod against the cam disk.

A further advantage of the lever drive unit resides in that the tension rod is connectable with the second slide by means of a locking coupling. The latter closes itself automatically when the slide unit frame is inserted into the housing. The said coupling can just as simply be loosened by tilting of the frame so that no cable mechanism has to be in or loosened during the assembly.

The coupling can be secured in a simple manner in that a spring pressing the tension rod into the locking position of the coupling is disposed at the joint between the long arm and the tension rod.

In the coffee machine of the prior art as discussed above, the return movement of the first slide ends at a stationary stop element in an end position past which the second slide moves with the brewing chamber into its emptying position. These separate end positions have the drawback that the guide track must have a longer configuration. In the coffee machine according to the invention, on the other hand, both slides, and thus the straining unit and the structural unit, are roughly on top of one another when in the end position. This is achieved in a simple manner in that the stop element is movable in a controlled manner out of the path of the slides. The first slide is thus stopped only temporarily and follows the second slide after removal of the stop element, under the pressure of its return springs. The second slide is held in the resting position, under prestress, by the lever drive unit.

In a simple manner, a push rod mounted for vertical movement can be raised out of a lower blocking position by a stop cam on the first slide by means of a pin disposed at the drive shaft. The stop element is thus controlled in a way that corresponds precisely to the movement cycle during a brewing process. The push rod can be passed from below during the movement of the slide into the brewing position by the stop cam which has a stop surface for the push rod receding in the direction of movement into the brewing position and an oppositely directed, substantially vertical stop surface.

When preparing coffee by pressing brewing water through the grind it is to advantage to hold the ratio between area and height of the volume of grind to a minimum so that the brewing water has the closest and longest contact possible with the coffee grind. The brewing chamber and thus the straining unit should thus have the smallest possible diameter. On the other hand, it is desirable to keep the plunger stroke down to a minimum so as to limit the overall height of the entire device. In the coffee machine of the prior art described above this is achieved in that the cylinder has a larger outer diameter than the brewing chamber, and the latter widens conically toward the upper edge. This, however, poses the risk that coffee grind residue will settle on the enlargement rim. The same risk would exist for the bottom ring of the cylinder surrounding the flow-through hole of the cylinder, for which reason the latter is covered by a sieve in the known coffee machine, which sieve prevents coffee grind from floating to the top. This sieve, however, will resist the forcing through of brewing water after becoming soiled and/or calcified and this resistance has to be overcome by the drive motor. Furthermore, there is the danger that it will become clogged from the bottom with coffee grind floated upwards, which will not be shaken off even during the return movement. These drawbacks are avoided in a coffee machine according to the invention in that the brewing cylinder is subdivided by an annular wall into an inner chamber with the diameter of the brewing chamber and an annular space, a flow-through hole connects both spaces, and the plunger has an inner plunger and an outer wall surrounding the latter at some distance apart and conforming to the outer wall. Thus, coffee grind can be poured into the inner space extending the brewing chamber over a small area with a greater height. Preferably, the brewing water is introduced into the annular space, from where it flows through the flow-through hole into the inner space. The effective plunger surface exceeds, however, the area of the inner space by the area of the annular space and is thus larger than the diameter of the brewing chamber. The plunger stroke, and thus the overall height of the coffee machine, can thus be kept to a minimum, and yet have the brewing water flow through a high volume of coffee grind. A further advantage consists in that the coffee grind can rise only in the inner space of the cylinder since a penetration into the annular space is prevented by the water flowing out of the same and through the flow-through hole. The walls of the inner space can be flush cylindrically with the walls of the brewing chamber. The inner plunger can have at its front face a radially protruding, elastic stripper ring which during the downward movement lays itself against the walls of the cylinder-inner space so that any adhering coffee grind is stripped off. When moving upward, the downward prestressed rubber is relaxed and hurls the coffee beans away. In a simple manner, coffee grind is prevented from being pulled along upward during the return movement of the plunger in that the inner plunger has an axially parallel, continuous air channel opening behind the stripper ring, which creates communication with the outer air. No vacuum can form here during the upward movement of the plunger and thus no coffee grind can be pulled upward.

The plunger stroke in the coffee machine of the prior art described above is effected by way of a cam disk disposed on the control shaft as actuating and controlling means for the movement of the plunger. For the usually one section of the control shaft with an outer diameter being flush with the other areas the cam disk must have a circle of the largest distance from the shaft axis, which circle corresponds to the plunger stroke plus the shaft radius. Corresponding to this largest extent of the cam disk, the movement clearance for the cam disk must be available toward both sides and toward the top. According to the invention, the size of the cam disk and the corresponding dimensions of the housing can be reduced in a simple manner in that the cam disk is mounted on a shaft section with reduced diameter disposed eccentrically to the axis of the shaft. As a result, when in the uppermost plunger position the end zone of the plunger rod cooperating with the cam disk can move up to into the cross sectional area of the control shaft. The shaft section moves at the turning of the control shaft with the cam disk downward so that the plunger stroke remains constant, although the area of the cam disk exceeding the diameter of the shaft is smaller by the diameter difference of the shaft section to the entire shaft.

Optimal dimensions result with a form of execution whereat the shaft section has approximately half the diameter of the adjoining shaft section and, seen in cross section, is disposed essentially between the shaft axis and the circumference of the adjoining shaft sections. The drawbacks of the plunger mounting and guidance in the coffee machine of the prior art, as described above, have already been considered. A constructionally simple, wedgeproof guidance device for the plunger is characterized according to the invention in that the traverse is mounted with a first end firmly on a guide rod mounted to be vertically shiftable in two stationary bearings and is loaded by means of a power accumulator and its second end is slidingly engaged in a slit guide. This guidance of the transverse requiress less constructional expenditure than two precisely parallel guide rods on either side of the traverse. Even with large measurement tolerances no danger of wedging exists. The drive motor for the control shaft needs thus not be designed for overcoming additional turning moments. The spring provided on the guide rod for plunger return may be made weaker and the turning moment to be applied for its tensioning may likewise be smaller.

A safe guidance of the traverse without danger of wedging is achieved in the area of the guide rod in a simple manner in that the bearings of the guide rod are at a distance from each other at least equal to the plunger stroke.

For simple mounting, a quick-coupling for connecting with the plunger rod can be arranged at the traverse. A friction-reducing support element cooperating with the cam disk can in a simple manner be disposed in the area of the quick-coupling.

One embodiment of a coffee machine according to the invention is illustrated in the drawings, in which.

Figure 1:
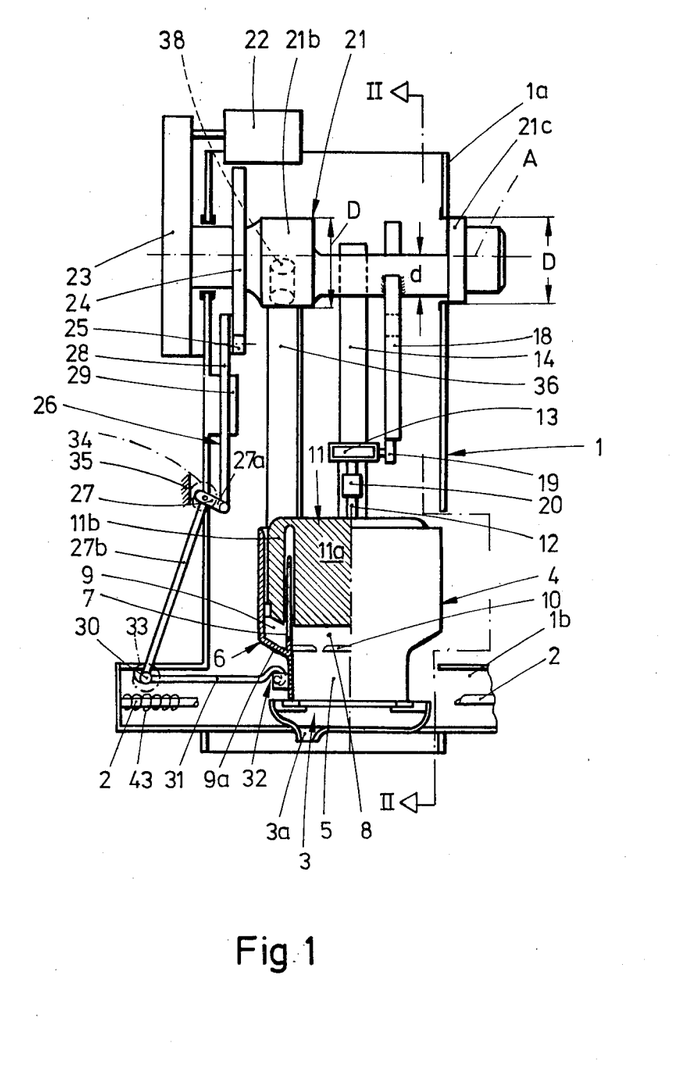
FIG. 1 shows a slightly schematized view, partly broken away, of a part of a brewing unit in brewing position.
Figure 2:
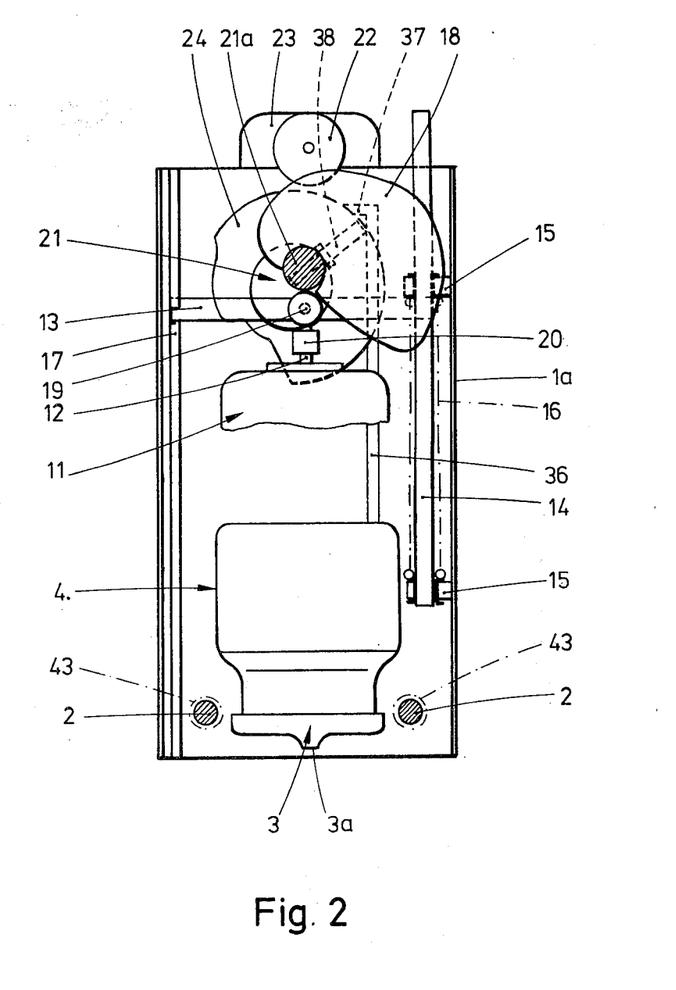
FIG. 2 shows a sectional view along line II—II of FIG. 1 within the brewing unit another working position.

The coffee machine according to the invention has a housing 1 for its brewing unit shown only by indication in FIGS. 1 and 2, with a vertical part 1a containing drive and control means among other things, and a horizontal part 1b. The horizontal part 1b limits mainly lateral movement for parts of the brewing unit which are movable in various working positions, and carries the guide track only indicated in FIGS. 1 and 2 (consisting of two parallel slide rods 2). The horizontally shiftable part of the brewing unit is mainly made up of a straining unit denoted as a whole by 3 and a structural unit denoted as a whole by 4. The structural unit 4 is horizontally movable relative to the straining unit, but during a large part of the working travel and in various operating positions, as in the brewing position shown in FIG. 1, it is above the straining unit. The structural unit 4 comprises a brewing chamber 5, a cylinder firmly joined therewith and denoted as a whole by 6, whose outer diameter exceeds that of the brewing chamber 5. As shown by the cylinder half broken open on the left in FIG. 1, said cylinder 6 is subdivided by an inner annular wall 7 being flush with the wall of the brewing chamber into an inner chamber 8 and an annular space 9. The inner chamber and the annular space communicate through slitlike flow-through holes 10 between annular wall 7 and the bottom 9a of the annular space.

During the brewing process illustrated in FIG. 1, a plunger denoted as a whole by 11 moves in the cylinder 6. This position is shown in FIG. 1. As indicated there schematically, to be explained more fully later on with respect to FIG. 10, plunger 11 has an inner plunger 11a and a roughly bell-shaped outer wall 11b surrounding the same and conforming to the annular space of the cylinder. Plunger 11 is fastened with its rod 12 on a traverse 13. The traverse is disposed in the vertical part of the housing 1a so as to be adjustable in height as follows: a first end is firmly joined with a guide rod 14, which is verticably shiftable in two bearings 15 arranged stationary on part 1a of the housing (FIG. 2). The distance between the bearings is at least that of the height of the plunger stroke. A compression spring 16 surrounding the guide rods loads the traverse in upward direction. The second end of the traverse 13 engages in a slit guide 17 only indicated in FIG. 2, in which guide it is slidingly shiftable.

The vertical movement of plunger 11 is controlled by a cam disk 18. This disk cooperates with a friction-reducing support element in the form of a roller 19, which is mounted on traverse 13, preferably in the vicinity of a quick-coupling 20, through which the traverse is connectable with the plunger rod 12. Cam disk 18 is mounted on a control shaft denoted as a whole by 21, which is driven by means of a drive motor 22 via a gear system 23. The shaft section 21a carrying cam disk 18 has a diameter d, which is approximately half the size of the diameter D of the adjoining shaft sections 21b and 21c, and is eccentrically offset relative to shaft axis A in such a way that, seen in cross section, it is located mainly between shaft axis A and the circumference of the adjoining shaft section 21b. This arrangement of cam disk 18 on the control shaft 21 has the advantage, as seen from FIG. 2, that at the uppermost dead point of the plunger stroke the roll 19 is approximately level with shaft axis A, within the ideal cross section of the control axes. The largest distance of the cam disk circumference from the shaft axis, which determines the height of the plunger stroke, can thus be smaller by half the shaft diameter D than if the cam disk were disposed on a central shaft section. As a result, also the space requirement for the cam disk toward the top and the sides, and thus the size of the housing, is advantageously reduced.

The inventive idea of mounting the cam disk on an eccentrically disposed shaft section within the ideal shaft circumference is to enjoy protection independently of the inventive idea of the main claim.

Control shaft 21 carries a cam disk 24 at some distance apart from the cam disk 18. Cam disk 24 controls the horizontal movement of the structural unit in a manner which will be described more fully later on. It acts via a roller 25 on a lever system denoted as whole by 26. The lever system has an angle lever 27 mounted at the wall of housing 1, with a short arm 27a and a long arm 27b. The short arm 27a is hingedly coupled with a rod 28 carrying roller 25, which rod is vertically shiftable within a bearing support 29 on the wall of the housing. The long arm 27b of the angle lever is connected via a pivot pin 30 with a tension rod 31. The tension rod 31 engages the structural unit 4 indirectly or directly by means of a locking coupling denoted as a whole by 32. A spring 33 which loads tension rod 31 into the engaging position of the coupling is mounted on pin 30. A power accumulator in the form of a torsion spring presses roll 25 against cam disk 24 via a rod 28 and is mounted on pivot pin 35 of angle lever 27.

FIGS. 1 and 2 show, somewhat schematized, a vertical push rod 36, which is mounted so as to be vertically shiftable in a manner not shown in the drawings. The push rod has a roughly L-shaped cross section and carries a plate 37 (FIG. 2) at its upper end.

A pin 38 fastened so as to protrude on control shaft 21 in the zone of shaft section 21b (FIG. 2) cooperates with plate 37 during a short rotational section in such a way that the push rod is temporarily raised from its lower resting position. The action of the push rod on part of the horizontal movements will be described in the following in connection therewith.

The horizontal movements taking place during an entire coffee preparation process are shown schematically in FIGS. 3 through 7. Movement toward the brewing position is indicated by arrow B, and the return movement toward the resting position by arrow R. The position terms "in front" and "behind" as used hereinafter are to be understood in the sense of movement B into the brewing position.

The horizontal movement takes place by means of a first slide 39, which carries the straining unit 3, and by means of a second slide 40, on which the structural unit 4 is disposed. The first slide 39 is mainly underneath the slide rods 2 and is suspended on each of them by means of two slide elements 41a and 41b, 41a being the front slide element, and 41b being the rear slide element. The slide elements 41a and 41b are designed as lugs. The second slide 40 is supported on slide rods 2 with two likewise lug-shaped slide elements 42a and 42b. The distance between the front slide element 42a of the second slide and the rear slide element 42b is dimensioned to exceed slightly the distance between the front slide element 41a and rear slide element 41b of the first slide 39. The two slides are arranged on the slide rods so that the front slide element 41a of the first slide 39 sits in front of the front slide element 42a of the second slide 40 and the rear slide element 41b of the first slide sits in front of the rear slide element 42b of the second slide. The movement of both slides into the brewing position, i.e., in the direction of arrow B, is effected by means of the lever system 26. The latter engages at the second slide 40 on an eyelet 32a forming part of locking coupling 32. The second slide 40 is pulled by tension rod 31 of the lever system 26 and carries the first slide along in this direction of movement by reason of the former's front slide elements lying against those of the first slide. In the process, two pressure springs 43 are tensioned, which pressure springs surround each slide rod and are supported against the horizontal part 1b of the housing at one end, and against the front of the front slide elements 41a of the first slide at the other end. These springs effect the return movement in direction R of the first slide, which thereat supports sectionwise the second slide.

Figure 3:
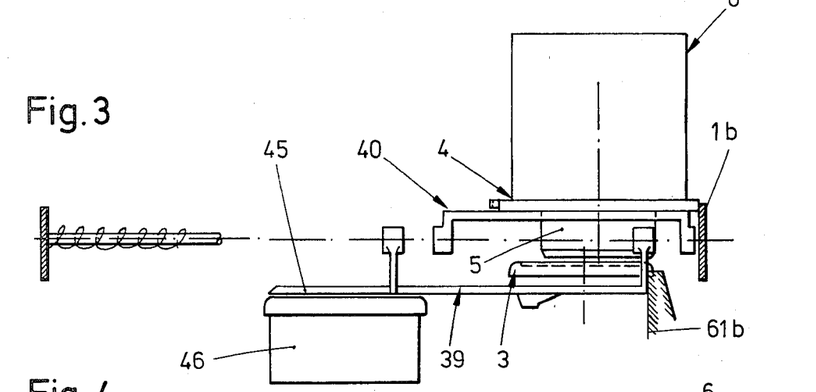
FIGS. 3–7 show in a schematized side views a partial area of the brewing unit in various working positions.

FIG. 3 shows the resting position. Both slides are in their end positions, on the right in the drawing, in the vicinity of the horizontal part 1b of the housing. The first slide lies approximately 10 mm in the direction of the brewing position against stop 61b. The brewing chamber 5 is therefore slightly staggered above the straining unit 3, whose upper edge has a ring-shaped gasket 44. In this position, the structural unit 4 is raised a few millimeters in a manner to be described later on, and thus does not press on the gasket. A cover plate 45 protruding in front of the front slide element 41a, in the lower zone of the first slide 39, is positioned above a collecting vessel 46 for the finished coffee. This vessel is underneath the vertical part of housing 1a, not shown here. The pressure springs 43 are relaxed.

Figure 4:
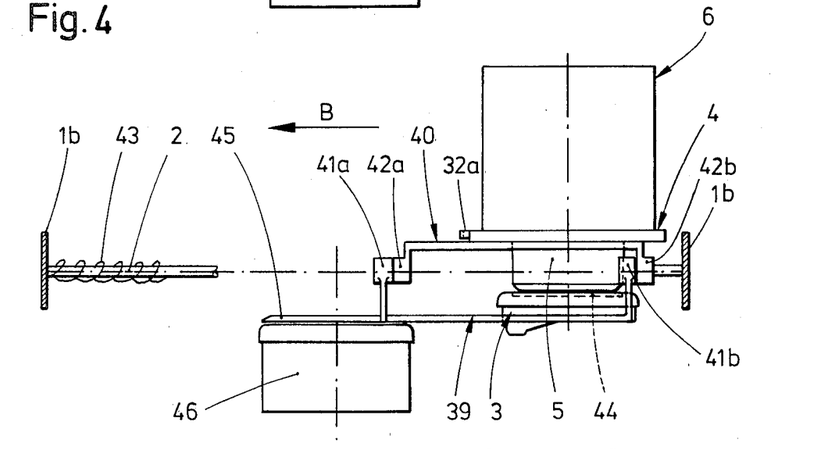

FIG. 4 shows the slides in a position intermediate the brewing and the rest positions. The structural unit 4 is no longer raised, but the lower edge of brewing chamber 5 is centered over and pressed tightly onto the annular gasket 44 of straining unit 3. In this position, and during the movement of the two slides into the brewing position, coffee grind is admitted through the inner chamber 8 of cylinder 6 into the brewing chamber 5.

Figure 5:
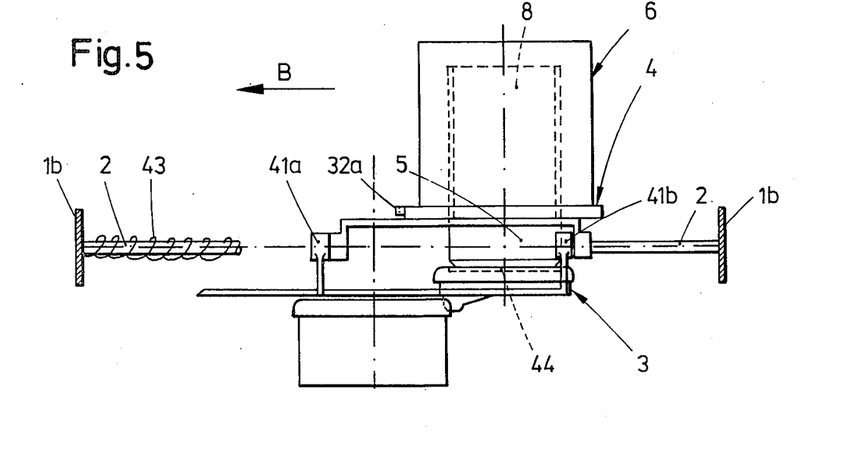

FIG. 5 shows an intermediate position of the two slides subsequent to that of FIG. 4 as they progress toward the brewing position. Both slides are stopped briefly. During this pause, a quantity of brewing water is admitted into the annular space 9. Following that, the two slides jointly move on into the brewing position. The resulting moistening of the coffee grinds results in better coffee utilization and/or shorter periods of preparation.

Figure 6:
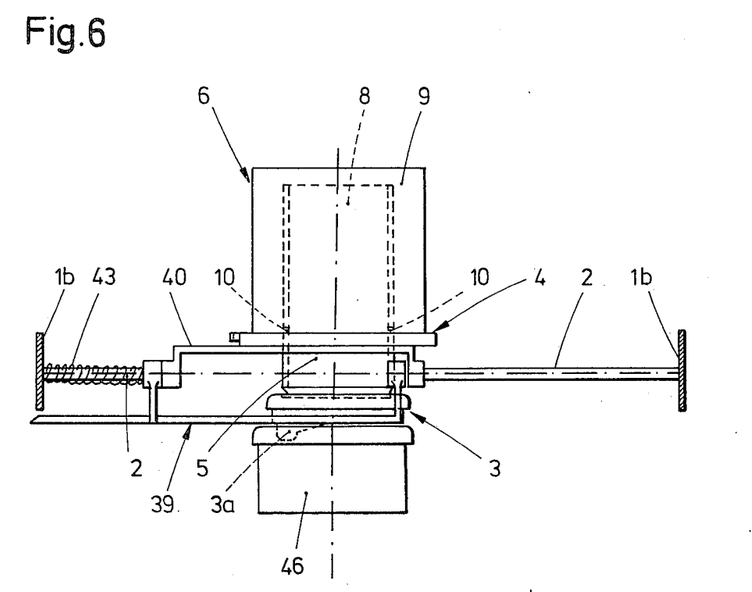

FIG. 6 shows the slides in the brewing position, in which the structural unit 4 is in the area of the vertical part 1b of the housing in such a way that the cylinder 6 is centrally disposed underneath plunger 11. This position is defined exactly via the lever drive system and its control disk 24, and is maintained during the coffee preparation. The brewing chamber 5, on which the structural unit 4 sits tightly, is then above the collecting vessel 46 in such a way that its flow-out hole 3a opens into the same.

In this position, the coffee preparing process proceeds as follows: Brewing water is admitted into the annular space 9 of the cylinder and is able to enter through slit-shaped flow-through holes 10 into brewing chamber 5 and the inner chamber 8 of the cylinder aligned therewith. Plunger 11 is moved downward and into cylinder 6 under the action of cam disk 18 and traverse 13. As a result, the inner plunger 11a moves in the inner chamber 8 of the cylinder and the annular outer wall 11b of the plunger moves in the annular space 9 of the cylinder, as shown schematically in the left, exposed area of the cylinder in FIG. 1. The plunger thus forces the brewing water out of the annular space 9 through the flow-through holes 10 and at the same time the brewing water in inner chamber 8 is forced through the coffee grind present in the brew chamber 5 and through the straining unit 3. The resulting coffee enters into the collecting vessel 46 via an outflow hole 3a into the collecting vessel 46. The subdivision of the cylinder into an inner chamber and an annular space and the corresponding design of the plunger has the important advantage that the coffee grind is housed within a space of smaller diameter and is thus filled up to a relatively high level, resulting in the brewing water having to cover a relatively long distance as it flows through the coffee grind. At the same time, the space for the brewing water and the effective plunger surface are greater than the diameter of the brewing chamber, as a result of which the plunger can be kept relatively small, and that nevertheless no coffee grind can get into the space having the larger diameter. Coffee floated upwards cannot penetrate into the flow-through holes 10, since during the brewing process water enters from there under pressure towards the inside.

Figure 11:
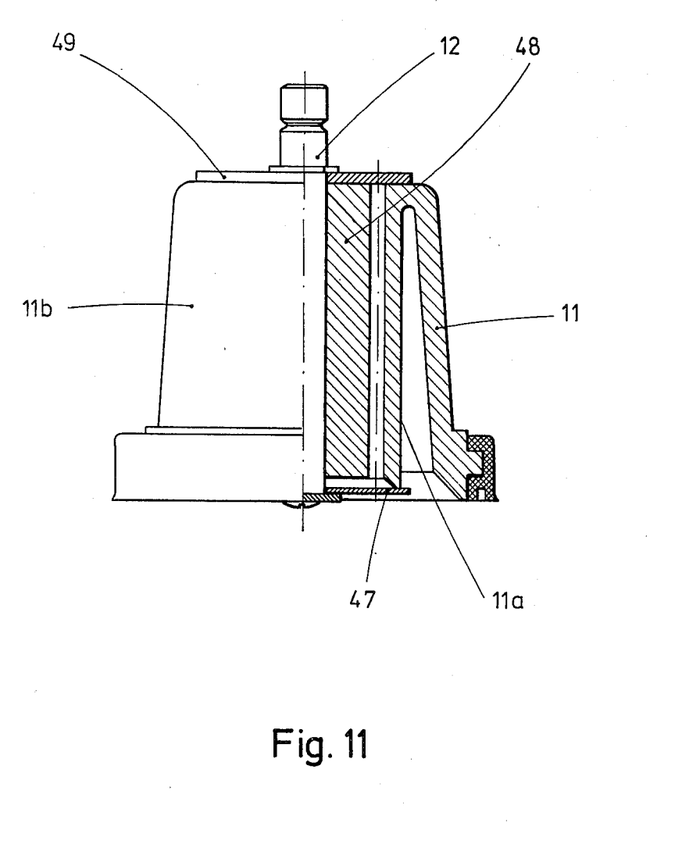
FIG. 11 shows a crossectional view of a plunger.

At the end of the brewing process, the cam disk 18 allows plunger 11 to return again to the top and out of the cylinder. In the process, an elastic stripper ring 47 (FIG. 11) which extends over the front face of the inner plunger and was tensioned during the downward movement, is relaxed. The stripper ring thereby cleans itself automatically during the upward movement in that adhering coffee grains are hurled away. At the same time, the stripper ring is bent up to such an extent that it frees the front hole of an air channel 48 disposed generally in an axially parallel orientation in the inner plunger. This air channel opens at the upper plunger surface underneath a circular plate 49 which is firmly attached to the plunger rod, which circular plate is lifted slightly from the upper edge of the outer wall 11b during the upward movement of the plunger. The air channel 48 thus creates a communication with the outer air and prevents forming of vacuum inside the cylinder as a result of which dry coffee grind could be pulled upward with the plunger. After the brewing water, the plunger, in its downward movement, presses the air present in the cylinder through the coffee grinds, thus drying the same.

At the end of the brewing process, when the plunger has moved completely out of the cylinder, the lever system 26 effects the return movement of the second slide 40, and thus allows also the return movement of the first slide 39. Both slides move together in direction R, the tension on pressure springs 43 being progressively reduced. After a short distance, an approximately vertical stop surface 50a of a stop lug 50 at the first slide 39 engages the already mentioned push rod 36, which in its normal position reaches into the path of the first slide. During the slide movement in direction B, the stop lug 50 pushes the push rod 36 out of the way and in upward direction by means of a surface 50B which slopes downwardly in this direction of movement.

Figure 7:
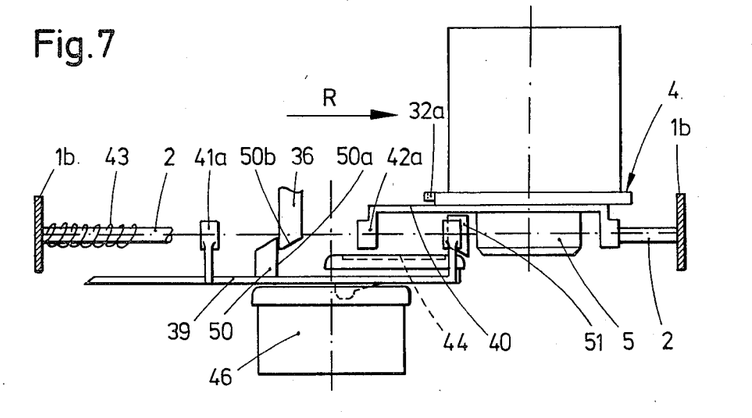

Through the cooperation of the stop lug 50 with the push rod 36, the first slide 39 is stopped in its return movement, while the second slide 40 is moved on by lever system 26 and is thus moved relative to the first slide 39, as shown in FIG. 7. At the beginning of this relative movement, the pressure loading the structural unit 4 onto the ring-shaped gasket 44 of the straining unit is lifted in a manner to be described below, so that the lower edge of the brewing chamber 5 can slide over the ring-shaped gasket 44 without any appreciable contact therewith. The brewing chamber 5 thereby carries along the dry coffee grind contained therein, which, after exposure of the lower opening of the brewing chamber, falls out or is hurled out by an abrupt downward movement of the structural unit 4 occuring in this area. A stripper 51 shown schematically in FIG. 7, which is mounted and spring-loaded between the brewing chamber 5 and the front slide element 42a on the second slide, in a manner to be described later on, moves over the straining unit and likewise strips off of it any remaining coffee grind.

At the end of this process, the already mentioned pin 38 on the control shaft 21 (FIGS. 1 and 2) temporarily lifts the push rod 36 to such an extent that it frees stop lug 50, thereby permitting movement of the first slide 39. The springs 43 move the first slide 39 so as to follow the second slide. The latter is gently slowed down by the combination of the slide bearing 41b and the elastic stop 61b (i.e., in the position mentioned above—about 10 mm before the end position of the second slide). The second slide is held in this end position under prestress by means of the lever system. This assures that the structural unit does not slide off the bearing surfaces and that for a removal or installation of the slide unit the lever system is sufficiently high for an automatic engagement and disengagement of the tension rod out of the coupling 32.

Figure 8:
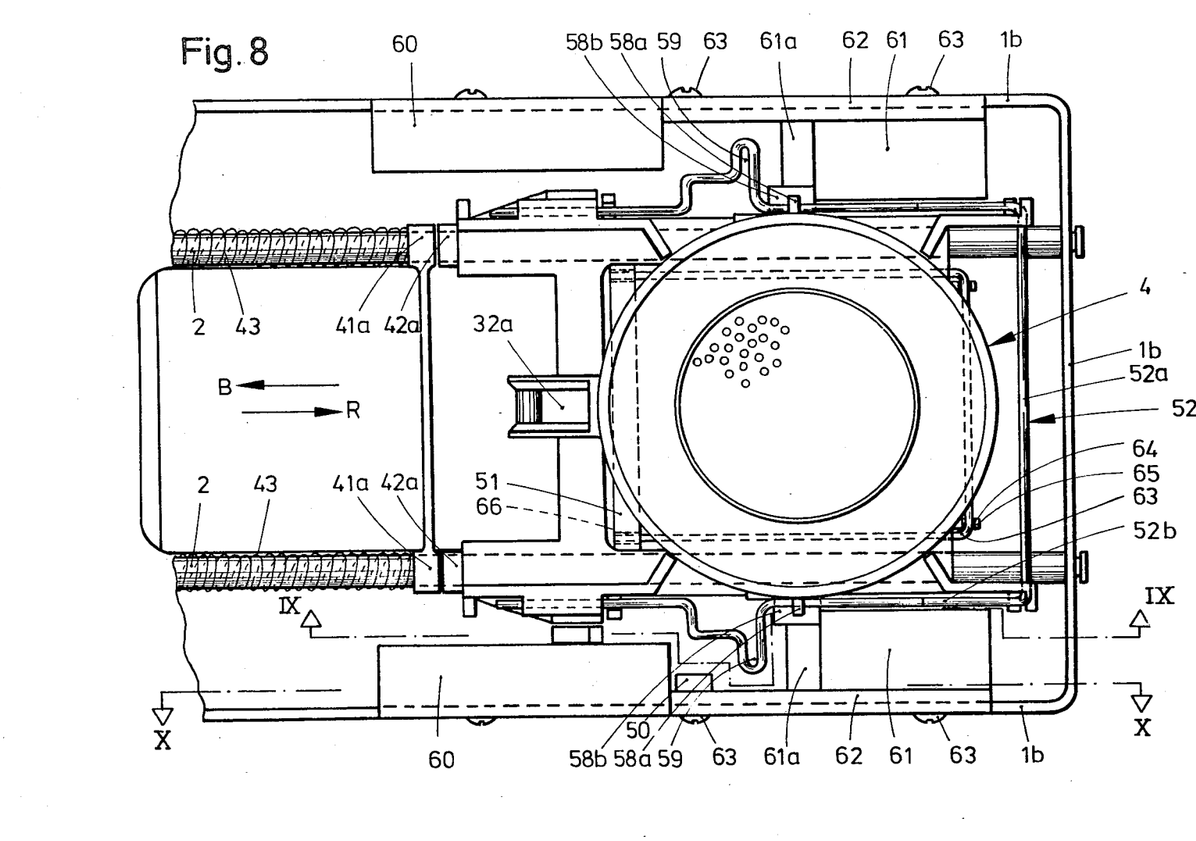
FIG. 8 shows a plan view of a brewing unit and part of a guide track in a working position corresponding to FIG. 3.
Figure 9:
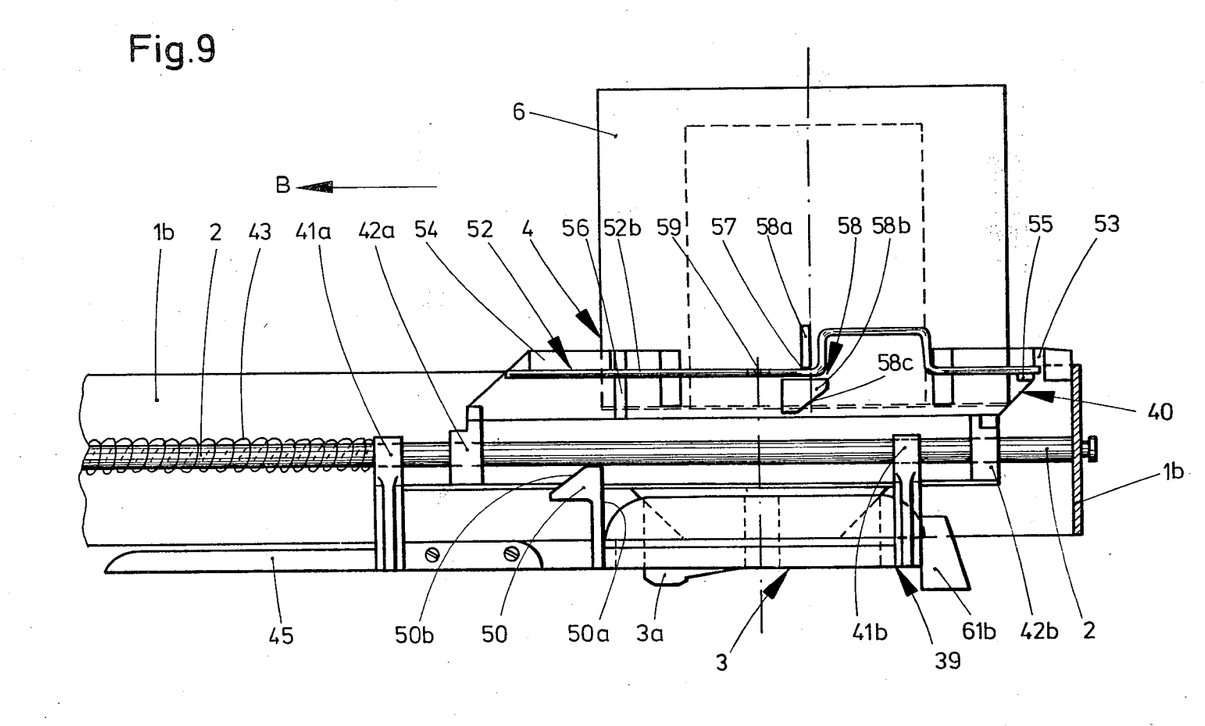
FIG. 9 shows a side view corresponding generally to a section through line IX—IX of FIG. 7.
Figure 10:
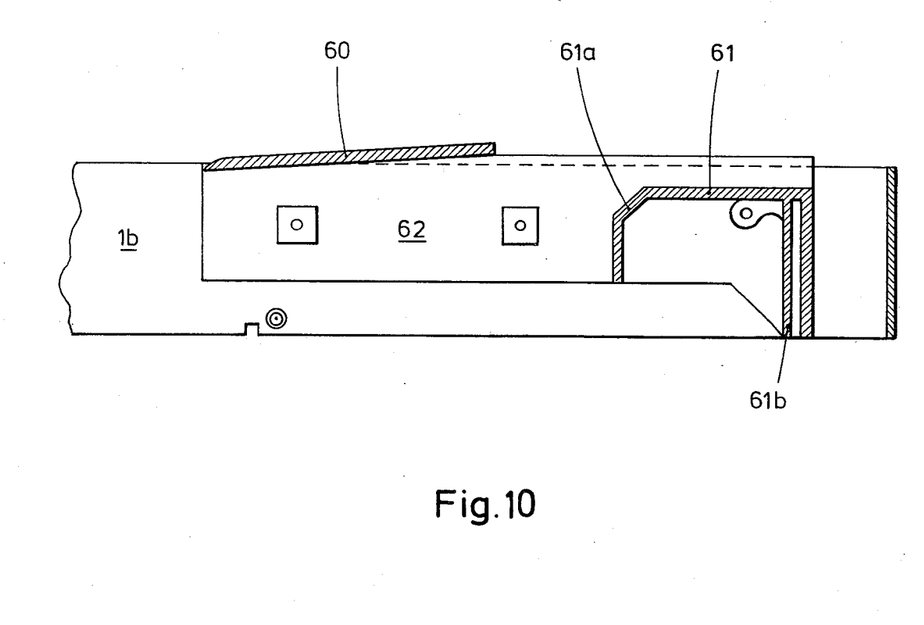
FIG. 10 shows a crossectional view along line X—X of FIG. 7.

FIGS. 8 through 10 show details of the two slides 39 and 40 and of the horizontal part 1b of the housing in the area outside the brewing position. These figures illustrate in particular the fastening of the structural unit 4 consisting of brewing chamber 5 and cylinder 6 on the second slide 40, as well as the projections and sloped surfaces cooperating to temporarily raise the brewing unit during the movement process.

The structural unit 4 is mounted and pressed downward on the second slide 40 by means of a bending spring 52. Bending spring 52, as seen from the top view of FIG. 8, is essentially of a U-shaped configuration. Its cross piece 52a extends behind the structural unit 4, and its arms 52b on either side of the latter. Arms 52b are supported at the rear and front areas of the second slide 40 between upper projections 53 and 54 and lower projections 55 and 56—the rear ones are named first. At the structural unit 4, the arms 52b are supported in grooves 57. The same are developed between the upper part 58a and the lower part 58b of a nose 58, which is formed in the outer wall of cylinder 6. The lower part of nose 58b has a rearwardly directed, sloping surface 58c which rises in the said direction. Each arm 52b has a bent loop 59 approximately at its center, as shown more clearly in FIG. 8. The loops 59 extend in the main plane of bending spring 52 and laterally outwardly of the arms.

A front sloped surface 60 and a rear sloped surface 61 are disposed at the side walls of the horizontal part 1b of the housing. The same, together with a joining wall 62, are made of one piece and fastened by means of screws 63 on the horizontal part 1b of the housing. They are shown in greater detail in the cross sectional view of FIG. 10. The front sloped surface 60 rises slightly toward the rear. The rear sloped surface 61 has at its front a sloped section 61a that rises toward the rear. Stop 61b for the first slide is elastic.

In the movement cycle described with respect to FIGS. 3 through 7, the front sloped surface 60 cooperates with the loops 59 of bending spring 52 as follows: At the movement of the slides into the brewing position (arrow B), the loops 59 slide along under the sloped surface 60. The bending spring 52 presses the structural unit 4 downward so that the latter sits tightly on the straining unit 3 moved along by the first slide 39. At the return movement (arrow R), loops 59 run onto the upper surface of the front sloping surface 60. The pressure of the bending spring downward is thus cancelled and the structural unit is slightly raised from the straining unit 3 via the part of arm 52b penetrating groove 57 and directly adjoining directly loop 59, said part being forced in this position against the upper part 58a of lug 58. This takes place in the zone of movement in which the first slide 39 is held by push rod 36, while the second slide 40 continues to move rearward. This movement can thus take place without any stress on the sealing surfaces arranged to both sides thereof. At its rear end, the front sloped surface 60 breaks off vertically. The arms 52b, which are tensioned while running over the front sloped surface 60 by loops 59, move abruptly downward at the end of the front runup surface 60, and thus the structural unit 4 also so moves. As a result of this sudden movement, any coffee grind still present in brewing chamber 5 is hurled downward.

Shortly before reaching the end position shown in FIG. 3, the inclined sloped surface 58c of the lower part 58b of lug 58, which is present on the structural unit runs onto the sloped surface 61a of the rear sloped surface 61. The structural unit 4 again experiences thereby a slight lift. The first slide 39 following the second slide 40 in its movement into the resting position can thus move again under the structural unit 4, with straining unit 3, without the sealing surfaces wearing each other out at the relative movement.

FIG. 8 further shows how the boardlike stripper 51 is disposed on second slide 40 and, by means of a U-shaped bending spring 63, is supported and forced into the stripping position. Bending spring 63 is supported at the second slide, in the vicinity of its two corners, in grooves 64 on projections 65 of the second slide, and its front ends each engage in a hole 66 on stripper 61. The stripper 51 runs over the straining unit at the return movement (arrow R) of the structural unit 4, is loaded downward by bending spring 63, and strips off any remaining coffee grind from the straining unit 3.

What is claimed is:

1. A coffee machine of the type including a horizontal guide track means and a brewing unit mounted for reciprocal movement on said guide track between predefined rest and brewing positions, said machine comprising:

first and second slide means mounted for sliding movement on said track means;

a straining unit mounted to said slide means for movement therewith;

a brewing chamber with an open bottom mounted above said straining unit to said second slide means for movement therewith, said brewing chamber being movable into a predefined loading position in alignment with said straining unit, said first and second slide means having cooperating means for moving said brewing chamber into said brewing position together with said straining unit, and into an emptying position at which it is horizontally displaced with respect to said straining unit;

a cylinder joined with said brewing chamber and extending thereabove, said cylinder forming a structural unit with said brewing chamber and being moved together therewith along said guide track means; and plunger means mounted for axial movement at said brewing position in a direction generally perpendicular to the movement of said structural unit, whereby said plunger means is axially movable into and out of said cylinder when the same is in the brewing position, for forcing into said brewing chamber brewing water which is provided to said cylinder.

2. A machine as set forth in claim 1 further comprising:

rigid and elastic projections disposed, respectively, on said structural unit and said second slide means;

power accumulator means for resiliently loading said structural unit downward; and lifting means on the brewing chamber in the vicinity of said guide track acting against said power accumulator as said brewing chamber passes over specified sections of said guide track, said lifting means comprising rigid, sloped surfaces disposed laterally of said guide track and cooperating with said rigid and elastic projections.

3. A machine as set forth in claim 2, wherein the power accumulator is an elongated resilient member acting as a bending spring and supported under prestress on the second slide.

4. A machine as set forth in claim 3, wherein the resilient member is generally U-shaped and has arms extending to either side thereof supported on the structural unit in grooves.

5. A machine as set forth in claim 4 wherein said grooves on said structural unit are disposed in laterally protruding lugs, said lugs each having an upper part and a lower part.

6. A machine as set forth in claim 5, wherein the lower part of at least one lug has a sloped surface and one further sloped surface laterally of the guide track, receding in direction of the brewing position, at the end zone father away from the brewing unit, coacts with said sloped surface of said lug.

7. A machine as set forth in claim 1 further comprising a power accumulator means for resiliently loading the structural unit downward and lifting means on the brewing chamber and in the area of the guide track acting against said power accumulator in specified sections of said guide track, said lifting means comprising rigid sloped surfaces laterally of guide track which cooperate with rigid and elastic projections at the structural unit and the second slide.

8. A machine as set forth in claims 3 or 4, further comprising laterally protruding loops of said arms, adjacent to the points of support on the structural unit and sloped surfaces laterally of the guide track with which said loops cooperate as projections.

9. Machine as set forth in claim 8, wherein the sloped surfaces are disposed in the vicinity of the emptying position, descent toward their ends closest to the brewing position, and rise substantially vertically at their ends furthest from said brewing position.

10. A machine as set forth in any one of claims 1, 2, 7 or 5, further comprising a stripper for the straining unit disposed on the second slide in the direction of movement into the brewing position, before the brewing unit, and a power accumulator loading said stripper downward.

11. A machine as set forth in any one of claims 1, 2, 7 or 3 comprising a guide track for the first slide means including two slide rods which carry pressure springs for the return movement, the same slide rods forming a guide track for the second slide means, the pressure springs engaging only the first slide means.

12. A machine as set forth in claim 11, wherein each slide means comprises two spaced apart slide elements, mounted on each slide rod so that on each slide rod the slide elements of the two slide means alternately succeeding one another.

13. A machine as set forth in claim 12, wherein the front slide elements of the first slide means are mounted closest to the brewing position, followed by the front slide elements of the second slide means.

14. A machine as set forth in any one of claims 1, 2, 7 or 3 wherein means for the second slide means carrying structural unit includes a lever drive unit which engages at said second slide means, and a cam disk disposed on a control shaft controls said lever drive unit.

15. A machine as set forth in claim 14, further comprising a housing with at least one wall, the lever drive unit having an angle lever mounted for pivotal movement on a wall of the housing and a power accumulator resiliently loading said angle lever towards one extreme of its movement, said lever having a short arm and a long arm, a vertically guided rod being connected to said short arm, said rod having a free end, a roller cooperating with said cam disk being carried at said free end, the long arm having a free end connected pivotally with one end of a tension rod engaging with its second end the second slide, and a cam disk for actuating said tension rod to move said second slide into the brewing position and, under the action of the power accumulator, into the resting position.

16. A machine as set forth in claim 15, wherein the power accumulator comprises a torsion spring which is mounted at the pivot of said angle lever and presses said vertically guided rod against said tension rod actuating cam disk.

17. A machine as set forth in claim 16, further comprising a locking coupling for connecting the tension rod with the second slide.

18. A machine as set forth in claim 15, further comprising a locking coupling for connecting the tension rod with the second slide.

19. A machine as set forth in claim 15, further comprising a spring disposed at the pivotal connection between said long arm and said tension rod, for forcing said tension rod into a position of engagement with said structural unit.

20. A machine as set forth in any one of claims 1, 2, 7 or 3 further comprising a stop element stopping the return movement of the first slide from the brewing position, the stop element being movable in a controlled manner out of the path of the slide.

21. A machine as set forth in claim 20, further comprising a push rod forming said stop element, said push rod being mounted for vertical movement so as to be raisable from a lower blocking position, a stop lug on said first slide cooperating with said push rod in said blocking position to achieve blocking and a pin mounted on said control control shaft in a position to engage said push rod to achieve lifting thereof.

22. A machine as set forth in claim 21, wherein said stop lug has a sloped surface for said push rod, said sloped surface descending in the direction of the brewing position, and an oppositely pointing, generally vertical stop surface.

23. A machine as set forth in any one of claims 1, 2, 7, 3 or 4 wherein the cylinder has an annular wall subdividing it into an inner chamber with the diameter of brewing chamber and an annular space surrounding the inner chamber, at least one flow-through hole connecting the two spaces, the plunger comprising an inner plunger and an outer wall surrounding the former at a distance therefrom and conforming to the annular space.

24. A machine as set forth in claim 23, wherein the annular wall has at least one gap between itself and the bottom of cylinder defining a flow-through hole.

25. A machine as set forth in claim 23 wherein brewing water is introduced into the annular space.

26. A machine as set forth in claim 23, wherein the inner plunger has at its front face a radially protruding, elastic stripper ring.

27. A machine as set forth in claim 26 wherein the inner plunger has a generally axially parallel, continuous air channel opening behind the stripper ring.

28. A machine as set forth in any one of claims 1, 2, 7, 3 or 4 comprising a cam disk mounted on a control shaft as actuating and controlling means for the plunger movement, and a shaft having a section with reduced diameter connected eccentrically to the control shaft axis, said cam disk being on said shaft section.

29. A machine as set forth in claim 28, wherein said shaft section has roughly half the diameter of the adjoining shaft sections and, seen in cross section, lies mainly between the shaft axis and the piriphery of the adjoining shaft sections.

30. A machine as set forth in claim 28, wherein the eccentric shaft section is laterally disposed of the cam disk and is larger than the width of the traverse plus the friction reducing supporting element.

31. A machine as set forth in any one of claims 1, 2, 7, 3 or 4 having a traverse to both sides and carrying the plunger at the center, a guide rod to which the traverse is mounted firmly at one end, its second end being engaged for sliding movement in a slit guide, two stationary supports supporting the guide rod for vertical slidabing movement of a power accumulator for loading the guide rod.

32. A machine as set forth in claim 31, wherein the supports of guide rod are separated by a distance corresponding to at least the length of the plunger stroke.

33. A machine as set forth in claims 31 wherein, as power accumulator, a pressure spring is supported in the area of guide rod between its lower bearing and traverse.

34. A machine as set forth in one of claims 1, 2, 7, 3 or 4, being further characterized in that a quick-coupling is mounted on traverse for connection with plunger rod.

35. A machine as set forth in claim 34, further comprising a support element to reduce friction cooperating with said disk and provided in the area of the quick-coupling.

* * * * *